United States Patent [19]

Inglett

[11] Patent Number: 6,060,519
[45] Date of Patent: May 9, 2000

[54] SOLUBLE HYDROCOLLOID FOOD ADDITIVES AND METHOD OF MAKING

[75] Inventor: George E. Inglett, Peoria, Ill.

[73] Assignee: The United States of America as represented by the Secretary of Agriculture, Washington, D.C.

[21] Appl. No.: 09/130,788

[22] Filed: Aug. 7, 1998

[51] Int. Cl.[7] ...................................................... A23B 9/00
[52] U.S. Cl. .......................... 516/77; 252/363.5; 426/506; 426/570; 426/573; 516/105; 536/123.12
[58] Field of Search ...................... 516/77, 105; 426/506, 426/573, 570; 536/123.12

[56] References Cited

U.S. PATENT DOCUMENTS

| | | | |
|---|---|---|---|
| 2,365,097 | 12/1944 | Murdock | 516/77 X |
| 3,115,410 | 12/1963 | Huffman | 516/105 |
| 3,754,925 | 8/1973 | Kimura et al. | 516/105 X |
| 4,012,333 | 3/1977 | Towle | 426/573 X |
| 4,311,717 | 1/1982 | McGinley | 516/77 X |
| 4,435,429 | 3/1984 | Burrows et al. | 426/573 X |
| 4,485,120 | 11/1984 | Gantwerker et al. | 426/625 |
| 4,497,840 | 2/1985 | Gould et al. | 426/560 |
| 5,082,673 | 1/1992 | Inglett | 426/21 |
| 5,380,542 | 1/1995 | Jenkins et al. | 426/573 |
| 5,738,805 | 4/1998 | Chaundy et al. | 516/77 |
| 5,753,288 | 5/1998 | Ogawa | 426/573 X |
| 5,766,662 | 6/1998 | Inglett | 426/481 |
| 5,876,619 | 3/1999 | Skaggs et al. | 536/123.12 X |

*Primary Examiner*—Richard D. Lovering
*Attorney, Agent, or Firm*—M. Howard Silverstein; Curtis P. Ribando; John D. Fado

[57] ABSTRACT

Hydrocolloidal compositions recovered from the liquid fraction obtained by subjecting oat or barley substrates to a heat-shearing treatment are rich in soluble fiber, principally β-glucan, and are substantially free of insoluble fiber particles. Dispersions of these compositions are smooth in texture and are useful as texturizers and nutritional substitutes for dairy products in food compositions.

13 Claims, 3 Drawing Sheets

A = Oat Bran Hydrocolloid   B = Hydrolyzed Oat Bran   C = Oat Bran   D = Temperature

SOLUBLE HYDROCOLLOID FOOD ADDITIVES AND METHOD OF MAKING

BACKGROUND OF THE INVENTION

1. Field of the Invention

This invention relates to the separation of cereal hydrocolloidal compositions from the crude fiber components of oat, barley, or combinations of grain products. The cereal hydrocolloidal compositions are useful as texturizers and nutrients for improving the health benefits of foods.

Dietary fibers are the soluble and insoluble components of cell walls that are resistant to endogenous digestion in the human upper digestive tract [Am. J. Clin. Nutr. 25: 464–465 (1972)]. Such fibers consist primarily of cellulose, hemicellulose, pectic substances, oligosaccharides, lignin, gums and mucilages.

Dietary fiber has been an important food component since early times. Diets containing significant amounts of dietary fiber are known to assist in the digestive process. Burkitt et al. [Lancet 2: 1408–1411 (1972)] teach that dietary fiber has a role in the prevention of certain large-intestine diseases, including cancer of the colon and diverticulitis. Burkitt et al. also indicate that serum cholesterol rises when dietary fiber is removed from the diet, and that eating a fiber-rich diet lowers serum cholesterol. Trowell [Am. J. Clin. Nutr. 25: 464–465 (1972)] and Dreher [Handbook of Dietary Fiber, An Applied Approach, Marcel Dekker, Inc., New York, N.Y. (1987)] have reported on similar conclusions regarding the relationship between fiber and health benefits.

It is now known that soluble and insoluble fibers provide different health benefits. For example, wheat bran is very rich in insoluble crude fiber (mainly cellulose and hemicelluloses) and is excellent for decreasing the transit time of food through the digestive tract [Anderson et al., Am. J. Clin. Nutr. 32: 346–363 (1979)]. Some soluble fibers, especially beta-glucan, are reported to reduce total plasma cholesterol [Behall et al., J. Am. Coll. Nutr. 16: 46–51 (1997)].

2. Description of the Prior Art

Dietary fiber typically consists of morphologically intact cellular tissues of various seed brans, hulls, and other agricultural by-products that have a high content of crude fiber [Dintzis et al., Cereal Chem. 56:123–127 (1979)]. When added to foods, these fibers impart a gritty texture to the final product. One solution to this problem has been to grind the fibers to give finer powders, but these powders still retain their high crude fiber contents. Likewise, the alkaline or alkaline/peroxide treatment of agricultural byproducts as reported by Gould (U.S. Pat. Nos. 4,649,113 and 4,806,475), Gould et al. (U.S. Pat. No. 4,774,098), Ramaswamy (U.S. Pat. No. 5,023,103); and Antrim (U.S. Pat. No. 4,038,481) does not remove the crude fiber. Morley et al. (U.S. Pat. No. 4,565,702) and Sharma (U.S. Pat. No. 4,619,831) teach enrobing the high crude fiber insoluble dietary fibers with soluble fibers (gums) for providing better texture and mouthfeel.

Soluble fibers are water-soluble polysaccharides such as pectin-like fruit and beet by-products (Thibault et al., U.S. Pat. No. 5,275,834). There have been a number of reports of alkaline extraction of agricultural materials, including hulls and brans, for obtaining their soluble hemicellulose components (Wolf, U.S. Pat. No. 2,709,699; Rutenberg et al., U.S. Pat. No. 2,801,955; and Gerrish et al., U.S. Pat. No. 3,879,373).

Gould et al., U.S. Pat. No. 4,497,840, describe foods made from oat bran which contain at least 150% more crude fiber than the whole oat flour. Also, Murtaugh et al., U.S. Pat. No. 4,908,223, show grinding oat bran and rice products to make frozen desserts without any separation of crude fiber components. Rudel, U.S. Pat. No. 4,961,937, also used non-separated oat products in baked products.

The oat soluble fiber, also called oat gum or beta-glucan, of the oat groat was fractionated as a separate component by an extensive series of separation described by Hohner and Hyldon, U.S. Pat. No. 4,028,468. Another wet-milling of oats to give various fractions including oat proteins was described by Cluskey et al., Cereal Chem., 50, 475(1973). Also beta-glucan enriched cellulose-containing fiber with little starch was described by Lehtomaki et al., U.S. Pat. No. 5,183,677. Oat beta-glucan was water extracted from oat groat in U.S. Pat. No. 5,512,287 by Wang et al. Also, barley beta-glucan was purified by an alkaline extraction procedure of Bhatty (U.S. Pat. No. 5,518,710).

Inglett (U.S. Pat. No. 4,996,063) teaches that water-soluble dietary fiber compositions are prepared by treatment of milled oat products with α-amylase and removal of insoluble components by centrifugation. In a related development, Inglett (U.S. Pat. No. 5,082,673) teaches that a soluble dietary fiber and maltodextrin-containing product is prepared by hydrolyzing a cereal flour or a blend of cereal flour and starch with an α-amylase. This soluble fiber composition has been described for use in ready-to-eat cereal (Smith and Meschewski, U.S. Pat. No. 5,275,831) and low fat comminuted meat products (Jenkins and Wild, U.S. Pat. Nos. 5,294,457 and 5,585,131).

The use of mechanical shear to reduce the viscosity of cereal flours has been described by Gantwerker and Leong, U.S. Pat. Nos. 4,438,150 and 4,485,120, to prepare instant cereal porridges. There is no teaching or suggestion in these patents that involve separating any component of the cooked flours.

SUMMARY OF THE INVENTION

I have now discovered a novel class of hydrocolloidal compositions recovered from the liquid fraction obtained by subjecting oat or barley substrates to a heat-shearing treatment. These compositions are rich in soluble fiber, principally β-glucan, and are substantially free of insoluble fiber particles. The hydrocolloidal products are smooth in texture and display the properties of a dairy cream, coconut cream, or fat imitation on rehydration. They are recovered in about 70–95% yields.

In accordance with this discovery, it is an object of the invention to provide hydrocolloid gels that are smooth in texture, are rich in β-glucans, and have sensory properties that render them suitable for a wide-range of food applications.

It is also an object of the invention to provide a method for the isolation of the aforementioned hydrocolloids from oat and barley substrates.

It is also an object of the invention to extend the sensory properties of the subject hydrocolloids by coprocessing the oat or barley starting substrates with other cereal substrates.

A further object of the invention is to enhance the soluble β-glucan content of foods without adding the coarseness of crude insoluble fiber.

Other objects and advantages of the invention will become readily apparent from the ensuing description.

DETAILED DESCRIPTION OF THE INVENTION

Figure 1:
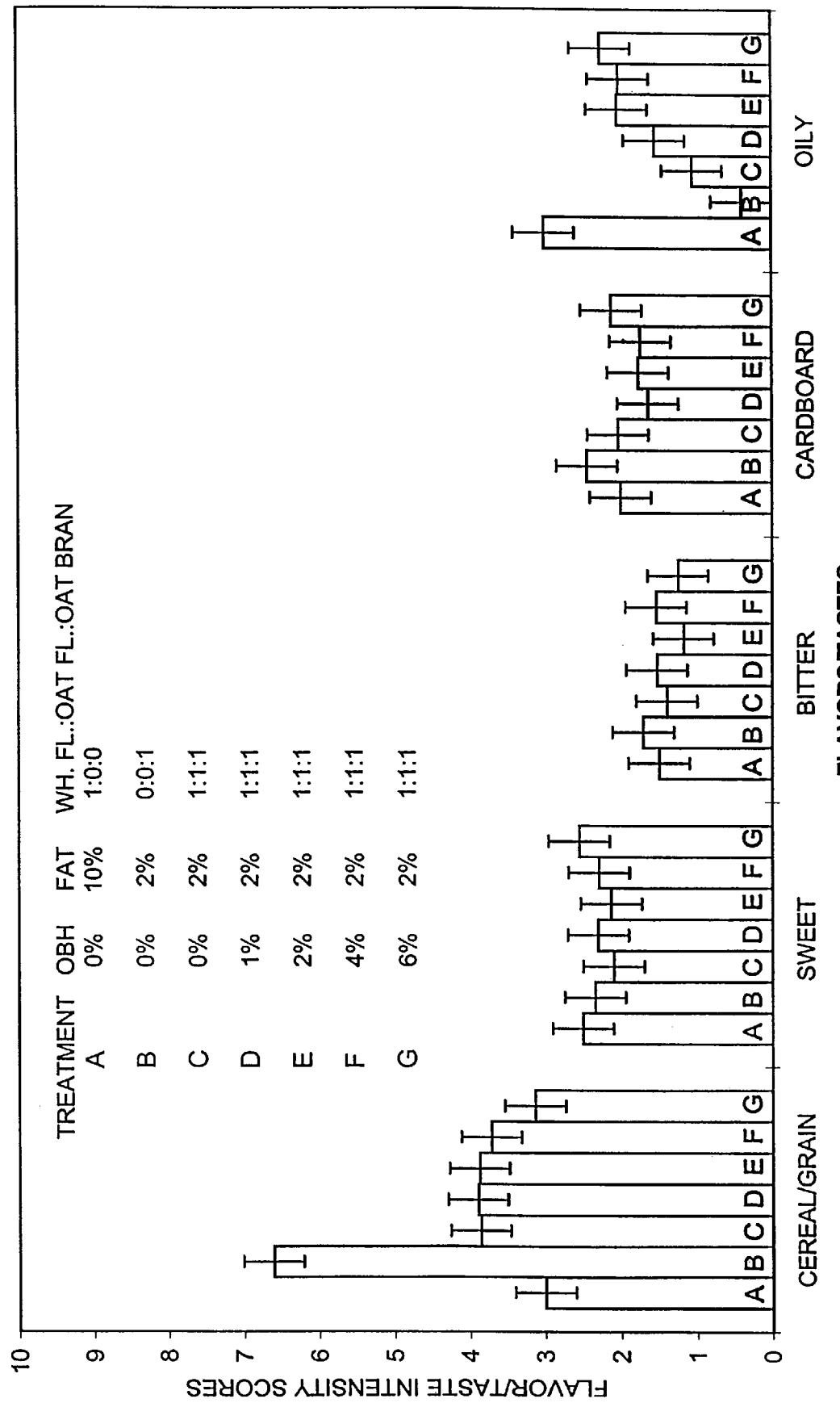
FIG. 1 presents the results of flavor evaluation of muffins prepared with various levels of the oat bran hydrocolloid of the invention.

The starting materials for use in the invention include any source of oat or barley bran or flour. Optionally, these materials may be coprocessed as described herein with other substrates including cereal bran, cereal flour, soybean flour, cereal starch, and tuber starch. Without limitation thereto, examples of such optional substrates include rice bran, corn germ, wheat germ, cereal flours, soybean flour, and cereal or tuber starches. "Flours" are defined herein to include any wet-milled or dry-milled fraction derived from the endosperm of the indicated cereal or legume or from a starchy tuber.

In general, the process of the invention involves a heat-shearing of the oat or barley substrate (optionally in combination with other grain substrates) in aqueous slurry in a series of treatments resulting in substantial disruption of the cellular structures to yield reductions in slurry viscosity greater than 90%. These treatments include heat and shear at a level to render the slurry sufficiently flowable that it will pass through pores of a filter, such as a sieve, or for insoluble crude fiber particles to be separated from the slurry by centrifugal forces. The specific conditions of treatments will vary depending on the nature of the starting substrate, other conditions employed in the overall treatment process, and the specific method of drying. Preferably, the substrate is subjected to conditions of elevated temperatures during application of both mechanical and hydraulic shear. The mechanical and hydraulic forces may be applied simultaneously with one another or sequentially. After the crude fiber solids are removed from the slurry, the recovered hydrocolloid-containing liquid is dried by conventional means.

The specific conditions for carrying out the process of the invention are as set forth below. Oat or barley substrate is slurried with water at concentrations in the range of about 5–25% (pH 4–9), and preferably in the concentration range of about 8 to 18% range. The pH of the slurry should be kept approximately neutral, e.g. pH 4–8, and preferably pH 5–7, in order to prevent significant solubilization of components in the starting substrate that would discolor the recovered hydrocolloid product or otherwise interfere with the desired hydrocolloid properties.

The forces for mechanically shearing the flour or bran during or after cooking are provided by a variety of shearing devices, such as dispersator, colloid mill, Waring™ blender, extruder, homogenizer, or the like. In most cases, it is preferred that the device applies mechanical shear to the cooking or cooked cereal materials. After the cooking with mechanical shear, it is then preferred to treat the slurried substrate with a hydraulic heat-shear such as excess steam jet-cooking [see R. E. Klem and D. A. Brogley, Pulp & Paper. Vol. 55, pages 98–103 (May 1981)]. A steam jet cooker can be used for providing adequate heat-shear without prior mechanical heat-shear, provided the slurry is recycled two or more times. Alternatively, the slurry can be passed through a continuous jet-cooker for 5 to 30 min.

The critical element of the process of the invention is providing adequate physical disruptive forces to the cereal substrate to break down the cellular structures into a flowable hydrocolloidal liquid slurry capable of being separated into liquid and solid portions. It is desirable to conduct the treatment under conditions of elevated temperatures in the range of about 75–190° C., and preferably in the range of about 90–150° C. The requisite time period of treatment will, of course, vary with the starting substrate and the other conditions of treatment, but will typically be on the order of about 1–60 minutes. Longer periods of time at high temperatures will cause browning and other degradation of the product. Lower temperatures will decrease the flow character of the slurry, making it unsuitable for the insoluble fibrous particles to be separated. It is preferred to have a viscosity less than 20 poise (P) at temperatures greater than 90° C. with solids contents between about 5 and 25%.

The viscosity of the cooked cereal slurry prepared under the aforementioned conditions of heat-shear is reduced to less than 90% of the initial slurry prior to treatment. The non-heat sheared cooked products are thick gelatinous non-flowable materials that are not amenable to separations as described below. Moreover, fiber particles will not separate from a thick gelatinous slurry greater than about 20 to 50 P in any reasonable time period to be considered practical. If it is desired to reduce slurry viscosity after the initial heat-shearing, either the heat-shearing may be repeated or the solids content of the slurry may be adjusted to improve the flowability.

The hydrocolloidal flowable products of the invention are contained in the hot liquid fraction after separation of the crude fiber particles from the heat-sheared-cooked slurry. This separation is carried out by centrifugation or filtration including sized opening such as sieves with washing of the fiber solids as necessary. The most suitable centrifugation forces (RCF) are between about 50 and 15,000×g. The results of Examples 2 and 8 suggest, there is a relationship between relative centrifugal force (RCF) and quantity of recovered insoluble materials after shearing. The most suitable pore opening for separating the crude fiber particles on sieves are between about 0.4 mm and 0.04 mm. If desired, multiple sieves can be used to stagger the particle loading for sieve separation. A vibrating separator is an efficient method of separating the insoluble particles. Product yield is improved by combining the hydrocolloid liquid from the separator with the hot water washings of the fiber particles. The concentration of the liquid can vary between about 5 to 25% solids content.

The hydrocolloid liquid recovered from centrifugation or filtration is dried by conventional methods, including drum drying, spray drying, freeze drying, hot-air, and the like. The dried products are readily dispersible in water to give a high viscosity creamy fluid.

The products of the invention are thermo-shear-thinning gels, or hydrocolloids. The term "thermo-shear-thinning" is used herein to mean that aqueous dispersions of the gels demonstrate significantly reduced viscosities (at least about 50% reduction) at elevated temperatures (at least up to about 95° C.), as compared to the viscosities at ambient temperatures. For example, when dispersed in water at 10% solids, the hydrocolloids of the invention yield a viscosity greater than 5 poises at 25° C. and on heating to 95° C., exhibit a decrease in viscosity greater than 50%, preferably greater than 75%, and in some cases, 95% or greater. Starting substrates that have not been subjected to the heat-shear process described herein do not demonstrate this property. Typically, the hydrocolloid products are characterized by low crude fiber levels and by β-glucan levels in the range of about 1–15%, depending on the starting substrate and the specific conditions of treatment. For instance, with barley flour as the starting substrate, the β-glucan level in the final product may be as high as 15% dry weight basis, and preferably in the range of about 5–15%. With oat flour, the β-glucan level is typically in the range of 1–6%, preferably 2–6%. Oat bran will usually yield hydrocolloids having a β-glucan level in the range of 6–12%, and preferably 7–12%. The β-glucan component is completely solubilized by virtue of being in the soluble fraction. Crude fiber contents will typically be in the range of about 0.1–1%, and preferably in the range of 0.1–0.5%.

The smooth textured hydrocolloids are suitable as ingredients in preparing β-glucan-rich foods without imparting undesirable cotton-like or dry mouthfeel, or a sandy, bulky, chalky, or gritty texture characteristic of crude fiber. The hydrocolloids of the invention can be used as ingredients in a variety of food products, particularly in baked goods and desserts. They are especially suitable as substitutes for dairy or coconut creams. In baked goods, a replacement of a portion of the fat and/or replacement of a portion of the flour with the hydrocolloid product results in an enhancement of the soluble β-glucan content and the textural qualities, including moistness. Total replacement for dairy or coconut creams in ice cream and other desserts are possible using the invention materials, especially when the hydrocolloid is derived from oat bran.

The following examples are presented only to further illustrate the invention and are not intended to limit the scope of the invention which is defined by the claims.

EXAMPLE 1
Oat Bran Hydrocolloid

To 5100 ml deionized water in a 5-gal (19 l) container, 900 g of oat bran concentrate (Quaker Oats®) was added and mixed with a dispersator (PMC® Model 90, high viscosity head, about 10,000 rpm) to generate a temperature in the range of 80–95° C. Continuous shear force was applied to maintain this temperature for 30 min before adding 6 l of boiling water. The slurry was steam jet-cooked at 138–141° C. and 40–45 psi. The hot slurry from the cooker was immediately passed into a Sweco® separator with 50 and 80 steel mesh sieves to recover the hydrocolloid liquid. The wet fiber solids from the sieves were collected, reslurried with boiling water, and recollected on the sieves. The liquid wash is combined with the hydrocolloid liquid before drum drying the liquid to give oat bran hydrocolloid, 536 g. The combined wet fiber solids were oven dried to give 175 g. The analyses of the products are listed below:

| Material | Yield % | Water % | Crude Fiber % | Soluble β-Glucan % | Protein % | Crude Fat % | Ash % | Starch by diff. % |
|---|---|---|---|---|---|---|---|---|
| Oat Bran Invention Product | 76 | 6.8 | 0.4 | 9.0 | 23.4 | 5.7 | 3.1 | 51.6 |
| Fiber Particles | 24 | 3.8 | 13.9 | 7.7 | 23.1 | 4.0 | 8.2 | 39.3 |
| Control Oat Bran | 100 | 6.9 | 2.8 | 8.6 | 23.4 | 8.1 | 4.2 | 46.0 |

EXAMPLE 2
Oat Bran Hydrocolloid

A 4 l plastic container was placed in a 10 l plastic bucket and insulated as a steam heated bath. A Polytron® homogenizer with a PT-DA-6060/2WEC aggregate was used to mix 270 g of oat bran (Grain Millers) and 1.8 l boiling water (13% solids) with steam heat. The Polytron® was adjusted to give 5000 RPM agitation for 30 minutes before 1.5 l boiling water was added to give a 7.6% solids content. The slurry was heated to boil in a microwave oven before measuring the viscosity with a Cannon® LV2000 Viscometer at 82° C. using spindle # 2.

|  | RPM | | | |
|---|---|---|---|---|
|  | 6 | 12 | 30 | 60 |
| Viscosity, P | 2.5 | 2.2 | 2.0 | 1.8 |

The liquid was placed into centrifuge bottles, heated in a microwave to near 90° C., centrifuged at 4 different relative centrifugal force (RCF) values at near 45° C. for 20 min in a Beckman® centrifuge, Model J2-21. Top liquid layer was decanted and recovered as the hydrocolloid liquid and freeze-dried. The lower solids were discarded.

| Sample | Recovered Hydrocolloid %[a] | Centrifuge RCF, xg | Crude Fiber % |
|---|---|---|---|
| 2A | 59 | 44 | 0.74 |
| 2B | 58 | 707 | 0.49 |
| 2C | 52 | 2830 | 0.49 |
| 2D | 49 | 11300 | 0.33 |

[a]Yields were low because of losses in the small runs.

EXAMPLE 3
Oat Bran Hydrocolloid

To 5.1 l deionized water in a 5-gal (19 l)container, 900 g of oat bran concentrate (Quaker Oats®) was added using a dispersator (PMC® Model 90, high viscosity head, 10,000 rpm) to obtain a smooth textured slurry. To the slurry, 6 l of cool water was added before pumping into a recycling jet-cooker. The slurry was recycled for 10–15 min at a temperature of 138–141° C. and a pressure of 40–45 psi. After decreasing the steam pressure in the recycling tank, the slurry was pumped into basket centrifuge (Alpha deLaval®, B.B. EOM, Clarifier). The liquid was collected and drum dried to give oat bran hydrocolloid, 2000 g (73% yield). The solids from the centrifuge were oven dried to give 743 g. The oat bran hydrocolloid had the following composition:

| Material | Yield % | Water % | Crude Fiber % | Soluble β-Glucan % | Protein % | Crude Fat % | Ash % | Starch by diff. % |
|---|---|---|---|---|---|---|---|---|
| Oat Bran Hydrocolloid | 73 | 0.4 | 0.24 | 6.6 | 12.1 | 1.0 | 3.0 | 70.0 |

EXAMPLE 4

Viscosity of Oat Bran Hydrocolloid and Cooked Oat Bran Samples

Oat bran hydrocolloid was prepared according to the procedure of Example 1, except a single 70 mesh steel sieve was used instead of the stacked steel 50 and 80 mesh sieves. In separate 300 ml beakers, 25 gm samples of the hydrocolloid and cooked oat bran were mixed with 225 ml deionized water, mixed with a spatula, heated to boiling in a 900 watt microwave oven followed by heating at about 90 watts for 5 min (power one). Using ice to cool samples to progressively lower temperatures, the viscosity was measured at three temperature levels.

| Sample | Viscosity, Poise (P) @10% Solids Temperature (° C.) | | |
|---|---|---|---|
|  | 3 | 50 | 80 |
| Cooked Oat Bran, control | >1000 | 840 | 430 |
| Oat Bran Hydrocolloid | 95 | 15 | 5 |

The rheological properties of the same materials were measured using a CarriMed® $CSL^2$ 500 controlled-stress rheometer with a cone-and plate fixture. The oat bran hydrocolloid of the invention demonstrated its shear-thinning behavior from 1–200 $s^{-1}$ shear rate at 25° C. and 80° C. with a decreasing viscosity of 200P to 16P and 42P to 7P, respectively.

EXAMPLE 6

Oat Bran/Corn Germ (defatted) [1:1] Hydrocolloid Co-Processed

To 4 l deionized boiling water in a 5 gal (19 l) plastic container, 1000 g of defatted corn germ (Bunge®) was added and mixed with a dispersator for 15 min (PMC® Model 90, high viscosity head, 10,000 rpm) at a maximum speed to maintain a temperature of about 95° C. To the slurry, 5 l of boiling water was added and the solids collected on steel 50 and 80 mesh sieves (Sweco® separator). The solids were washed with 3 l of boiling water, removed from the sieves, and oven dried at 100° C. The sieve liquid was divided into two equal parts. Part A was drum dried to give corn germ (defatted) hydrocolloid with a crude fiber content of 0.82%. Part B was blended by mixing 300 g of oat bran hydrocolloid (see Example 1 for preparation) with the corn germ (defatted) hydrocolloid liquid and drum dried to give oat bran/corn germ (defatted) hydrocolloid with a crude fiber content of 0.59%.

EXAMPLE 7

Oat Flour Hydrocolloid

To 2040 ml deionized water in a 2.5-gal (10 l) container, 360 g of groat oat flour (Quaker Oats®) was mixed with a dispersator (PMC® Model 90, high viscosity head, about 10,000 rpm) at maximum shear speed to generate a temperature in the range of 80–95° C. The temperature was held by a continuous shear force rate for 30 min before adding 2 l of boiling water. The slurry was mixed before jet-cooking at 138–141° C. and 40–45 psi. The hot slurry from the cooker was immediately passed into a separator with 70 and 200 steel mesh sieves. The wet fiber solids were washed with boiling water to yield a dried fiber solids fraction (29 g) with a crude fiber content of 13.2%. The liquid wash was combined with the hydrocolloid liquid and drum dried to give oat flour hydrocolloid, 264 g, with a crude fiber content of 0.12%. Product analysis is given below:

| Material | Yield % | Water % | Crude Fiber % | Soluble β-Glucan % | Protein % | Crude Fat % | Ash % | Starch by diff. % |
|---|---|---|---|---|---|---|---|---|
| Oat Flour Hydrocolloid | 73 | 7.9 | 0.12 | 5.5 | 15.7 | 1.9 | 1.5 | 67.4 |
| Fiber Fraction | 27 | 3.6 | 13.2 | 5.0 | 24.5 | 3.9 | 6.6 | 49.8 |
| Oat Groat Flour | 100 | 11.1 | 1.2 | 4.8 | 15.3 | 6.6 | 2.0 | 59.0 |

EXAMPLE 5

Oat Bran/Soy Flour [1:1] Hydrocolloid Coprocessed

In a 5-gal (19 l) container, 8 l of boiling water and 950 g oat bran hydrocolloid (prepared as in Example 3) were mixed with a dispersator (PMC® Model 90, high viscosity head) to give a smooth slurry before adding 950 g soy flour (Bunge/Lauhoff®). The slurry was blended until a smooth texture was formed and a small amount of water was added to make it flowable. The slurry was drum dried to give oat bran/soy flour hydrocolloid, 1650 g, with a crude fiber content of 0.42%.

EXAMPLE 8

Oat Flour Hydrocolloid

In a 4 l tared plastic container in an insulated steam heated bath, a Polytron® homogenizer with a shredder aggregate (PT-DA-6060/2WEC) was used to mix 300 g of oat flour (Quaker Oats®) with 1.2 l of boiling water (20% solids) with steam heat. The rpm was adjusted to give a maximum agitation (about 5000 rpm). The agitation at high speed was continued for 30 minutes. Water was added to the container to adjust the weight to the original level to compensate for evaporative losses. The viscosity was measured using a Cannon® LV2000 viscometer, spindle # 2 at a temperature of 93° C.

|  | RPM | | | |
| --- | --- | --- | --- | --- |
|  | 6 | 12 | 30 | 60 |
| Viscosity, P | 20 | 17 | 11 | 6 |

The slurry was divided into 4 equal parts.

Part A: The slurry was heated at near 90° C. and centrifuged at 1000 rpm for 20 min. The liquid supernatant was decanted and freeze-dried.

Part B: The slurry was heated to near 90° C., the viscosity was measured, and then the slurry was centrifuged at 8000 rpm for 20 min. The liquid supernatant was decanted and freeze-dried, discarding the solids.

Part C: The slurry was cooled to near 30° C., the viscosity was measured, and then the slurry was centrifuged at 1000 rpm for 20 min. The liquid supernatant was decanted and freeze-dried, discarding the solids.

Part D: The slurry was cooled to near 30° C., the viscosity measured, and then the slurry was centrifuged at 8000 rpm for 20 min. The liquid supernatant was decanted and freeze-dried, discarding the solids.

The influence of the relative centrifugal force (RCF) and temperature on the crude fiber contents are shown below:

| Sample | Shear Rate[1] RPM | Temp ° C. | Viscosity[2], P RPM | | | | RCF[3] Xg | Solids Content % | Hydrocolloid % | Crude Fiber % |
| --- | --- | --- | --- | --- | --- | --- | --- | --- | --- | --- |
|  |  |  | 6 | 12 | 30 | 60 |  |  |  |  |
| A | 5000 | 91 | 19 | 16 | 11 | 6 | 176 | 20 | 73 | 0.92 |
| B | 5000 | 89 | 25 | 20 | 11 | 6 | 11,300 | 20 | 66 | 0.38 |
| C | 5000 | 28 | 57 | 28 | 11 | 6 | 176 | 20 | 80 | 1.16 |
| D | 5000 | 26 | 57 | 28 | 11 | 6 | 11,300 | 20 | 71 | 0.32 |

[1]Brinkmann Polytron ® homogenizer, model PT 6000, shredder generator, PT-DA 6060/2WEC.
[2]Cannon ® LV 2000, spindle #2.
[3]Beckman ® centrifuge, model J2-21, rotor JA-10.

EXAMPLE 9
Oat Flour/Corn Germ (full fat) [1:1] Hydrocolloid Co-Blended

To 3 l deionized boiling water in a 20 l container, 1 kg of full fat corn germ (Quaker Oats®) was added and mixed by a dispersator (PMC® Model 90, high viscosity head, 10,000 rpm) at maximum speed for 15 min. The slurry was jet-cooked by recycling through the jet cooker 4 times before separating the solids using a Sweco® separator with 50 and 80 steel mesh sieves. The wet solids were washed with 2 l of boiling water and oven dried to yield a fiber/solids fraction (284 g) having a crude fiber content of 12.81%. The corn germ (full fat) hydrocolloid liquid was drum dried to give 561 g of solids with a crude fiber content of 1.12%. A dry blend of oat flour hydrocolloid (prepared as in Example 7) and corn germ (full fat) hydrocolloid had a crude fiber content of 0.62%.

EXAMPLE 10
Oat Flour/Wheat Germ (full fat) Hydrocolloid Co-Blended [1:1]

To 3 l deionized boiling water in a 20 l container, 1 kg of full fat wheat germ (Viobin®), was added and mixed by a dispersator for 30 min (PMC® Model 90, high viscosity head, 10,000 rpm) at maximum shear speed which maintained a temperature of about 95° C. The slurry was jet-cooked by recycling 4 times through the jet cooker before separating the solids on a Sweco® separator using 50 and 80 steel mesh sieves. The sieve solids were washed with 2 l boiling water and the hot water wash added to the original liquid. The dried fiber solids, 94 g, had a crude fiber content of 7.35%. The liquid was drum dried to give wheat germ hydrocolloid (680 g) with a crude fiber content of 1.72%. A dry blend of equal portions of an oat flour hydrocolloid (prepared as in Example 7) with the above wheat germ hydrocolloid gave a mixture with a crude fiber content of 0.35%.

EXAMPLE 11
Rice Bran Hydrocolloid

To 6.5 l deionized boiling water in a 20 l container, 2 kg of rice bran (Riviana®, Protex 20-S), was mixed with mild stirring before jet-cooking with recycling 4 times through the jet cooker. The slurry solids were separated by a Sweco® separator with 50 and 80 steel mesh sieves. The separated solids were washed with 4 l of boiling water and the water added to the original separated liquid. The liquid was drum dried to give a rice bran hydrocolloid (984 g) with a crude fiber content of 1.21%. The dried fiber solids, 594 g, had a crude fiber content of 12.36%.

EXAMPLE 12
Oat Flour/Rice Bran [1:1] Hydrocolloid Co-Processed

To 7 l deionized boiling water in a 20 l plastic container, 1 kg of rice bran (Riviana® Protex 20-S) and 1 kg of oat flour (Quaker Oats®), were mixed using a dispersator (PMC® Model 90, high viscosity head, 10,000 rpm) to give a smooth slurry in about 10 minutes. The slurry was jet-cooked by recycling two times before separating on a Sweco® separator using an 80 steel mesh sieve. The solids were washed with 2 l boiling water with the hot water wash being added to the prior separated liquid. Drum drying the liquid gave 1405 g co-processed oat flour/rice bran hydrocolloid [1:1] with a crude fiber content of 0.66%.

EXAMPLE 13
Barley Flour Hydrocolloid

To 12 l deionized boiling water in a 20 l container, 1.5 kg of barley flour (Prowashonupana® ConAgra®), was added and mixed by a dispersator for 15 min at maximum speed (PMC® Model 90, high viscosity head, 10,000 rpm) which maintained a temperature of about 95° C. The slurry was jet-cooked by recycling 2 two times through the jet cooker before collecting the solids using a Sweco® separator with a 80 steel mesh sieve. The solids were washed with 0.5 l boiling water and dried to yield fiber solids (104 g) having a crude fiber content of 7.42%. The combined wash liquid and liquid fraction from the separator was drum dried to give barley flour hydrocolloid (1206 g) with a crude fiber content of 0.42%.

EXAMPLE 14
Barley Flour/Rice Bran Hydrocolloid [1:1] Co-Processed

To 10 l deionized boiling water in a 20 l container, 1 kg of barley flour (ConAgra® Prowashonupana®) and 1 kg of rice bran (Riviana® Protex 20-S) were mixed with a dispersator (PMC® Model 90, high viscosity head, 10,000 rpm) to give a smooth slurry (10 min). The slurry was jet-cooked by recycling three times. The solids were collected on an 80 steel mesh sieve in a Sweco® separator and washed with 1 l boiling water to yield dried fiber solids (436 g) having a crude fiber content of 9.00%. The combined wash liquids and liquid fraction from the separator were drum dried to give 1330 g co-processed barley flour/rice bran hydrocolloid [1:1] with a crude fiber content of 1.68%.

EXAMPLE 15
Oat Bran Hydrocolloid as a Substitute for Coconut Cream in Desserts Oat bran hydrocolloid prepared by the process of Example 3 and dispersed in hot water at 5% was substituted solids content was substituted at various levels for coconut cream in 8 desserts prepared in the proportions shown in Table I.

Sensory evaluation of products including control was made by 25 trained panelists using a 9-hedonic scale for color, appearance, flavor, taste, texture and acceptability. The results are shown in Table II.

TABLE I

Standard formulas of desserts for 100 grams

| Products | Coconut cream | Sugar | Egg | Flour | Salt | Other Ingredients | Water | Others* |
|---|---|---|---|---|---|---|---|---|
| Coconut jelly | 17.12 | 25.25 | 10.70 | — | 0.09 | 1.03 (agar powder) | 45.38 | 0.43 |
| Taro conserve | 25.61 | 23.05 | — | — | 0.13 | 51.22 (mashed taro) | — | — |
| Crispy pancake | 37.40 | 20.33 | 4.07 | 36.58 | 0.40 | 1.22 (sesame seed) | — | — |
| Steamed banana cake | 20.67 | 23.85 | — | 11.13 | 0.60 | 39.75 (mashed banana) | — | 4.0 |
| Pumpkin in coconut syrup | 44.40** | 11.10 | — | — | 0.09 | 44.40 (pumpkin) | — | — |
| coconut pudding | 36.10 | 11.91 | — | 3.97 | 0.36 | 10.83 (sago) | 28.88 | 7.95 |
| Steamed glutinous rice with coconut cream | 33.71 | 14.61 | — | — | 1.12 | 50.56 (glutinous rice) | — | — |
| Coconut-cantaloup ice cream | 43.23** | 12.97 | — | — | 0.29 | 43.23 (cantaloup) | — | 0.29 |

*including vanilla powder, shredded coconut, lotus seed, pandan leaf juice and gelatin powder respectively.
**Addition of water to coconut cream in the ratio of 1:1.

TABLE 2

Sensory evaluation of desserts using oat bran hydrocolloid as coconut cream replacer[a,b]

| Products | Color | Appearance | Odor | Taste | Texture | Acceptability |
|---|---|---|---|---|---|---|
| Coconut | | | | | | |
| jelly control | 6.70b | 6.72b | 7.38a | 7.28a | 7.22a | 7.38a |
| 60% | 7.32a | 7.32a | 6.68b | 6.98ab | 6.96ab | 6.82b |
| 80% | 7.34a | 7.54a | 6.24c | 6.74bc | 6.64b | 6.66b |
| 100% | 7.24a | 7.36a | 6.48bc | 6.58c | 6.62b | 6.54b |
| Taro conserve | | | | | | |
| control | 7.62a | 7.65a | 7.77a | 7.77a | 7.56a | 7.63a |
| 60% | 7.62a | 7.62a | 7.52ab | 7.56ab | 7.40a | 7.38a |
| 80% | 7.58a | 7.50a | 7.33b | 7.50b | 7.21ab | 7.27a |
| 100% | 7.48a | 7.50a | 7.17b | 7.31b | 6.85b | 6.88b |
| | (p > 0.01) | (P > 0.01) | | | | |

TABLE 2-continued

Sensory evaluation of desserts using oat bran hydrocolloid as coconut cream replacer[a,b]

| Products | Color | Appearance | Odor | Taste | Texture | Acceptability |
|---|---|---|---|---|---|---|
| Crispy pancake | | | | | | |
| control | 7.98a | 7.92a | 8.18a | 8.04a | 8.06a | 8.22a |
| 60% | 7.54b | 7.62b | 7.42b | 7.50b | 7.72b | 7.46b |
| 80% | 7.12c | 7.52b | 7.02b | 7.36b | 7.52b | 7.16b |
| 100% | 6.76c | 6.92c | 6.02c | 6.68c | 7.00c | 6.20c |
| Steamed banana | | | | | | |
| cake control | 7.00b | 7.26a | 7.46a | 7.66a | 7.42a | 7.52a |
| 60% | 7.56a | 7.44a | 7.28a | 7.50ab | 7.20a | 7.30a |
| 80% | 7.50a | 7.44a | 7.14a | 7.44ab | 7.26a | 7.24a |
| 100% | 7.52a | 7.44a ($p > 0.01$) | 7.20a ($p > 0.01$) | 7.2.2b | 6.94a ($p > 0.01$) | 7.02a ($p > 0.01$) |
| Pumpkin in coconut syrup | | | | | | |
| control | 7.62a | 7.46a | 7.48a | 7.56a | 7.46a | 7.60a |
| 40% | 7.56a | 7.30a | 7.20ab | 7.30ab | 7.12ab | 7.30ab |
| 60% | 7.34a | 7.30a | 6.94b | 7.10b | 6.78b | 6.88b |
| 80% | 6.78b | 6.52b | 6.10c | 5.94c | 5.94c | 5.86c |
| Coconut pudding | | | | | | |
| control | 7.94a | 7.74a | 7.76c | 7.68a | 7.44a | 7.60a |
| 40% | 7.06b | 6.96b | 6.94b | 7.10b | 6.66b | 6.88b |
| 60% | 6.18c | 6.44c | 6.62b | 6.84b | 6.42b | 642c |
| 80% | 5.80d | 5.94d | 5.78c | 6.02c | 5.46c | 5.54d |
| Steamed glutenous rice with coconut | | | | | | |
| cream control | 7.92a | 7.70a | 7.60a | 7.70a | 7.58a | 7.72a |
| 40% | 7.52b | 7.44a | 7.06b | 7.16b | 7.24b | 7.28b |
| 60% | 7.00c | 6.88b | 6.46c | 6.78c | 6.44d | 6.52c |
| 80% | 7.10c | 6.96b | 6.60c | 6.68c | 6.86c | 6.70c |
| Coconut - cantaloup ice cream | | | | | | |
| control | 7.92a | 7.66a | 7.26a | 7.54a | 7.34a | 7.40a |
| 40% | 7.56b | 7.22b | 7.30a | 7.46a | 7.26a | 7.34a |
| 60% | 7.36bc | 7.02bc | 7.10a | 7.48a | 6.94a | 7.24a |
| 80% | 7.22c | 6.86c | 7.00a ($p > 0.01$) | 7.12a ($p > 0.01$) | 7.00a ($p > 0.01$) | 6.94a ($p > 0.01$) |

[a] prepared by blending 5% oat bran hydrocolloid in hot water (by weight) and refrigerated overnight before use
[b] In a column, means followed by same superscript are not significantly different at $p > 0.05$ and at $p > 0.01$ shown with parenthesis by ANOVA and DMRT.

Almost 100% substitution of the coconut cream by oat bran hydrocolloid was possible in all the formulations except for the pumpkin in coconut syrup formulation where high viscosity appeared to be unacceptable at high level substitution. Although a complete substitution for the coconut cream could be possible in the other desserts, many panelists favored an 80% substitution in desserts to allow some coconut flavor in the final product. It is expected that full flavor could be achieved at a higher level of oat bran hydrocolloid substitution by adding a small amount of artificial coconut flavorant to the formulation. All the desserts with oat bran hydrocolloid had very smooth textures characteristic of coconut cream products.

EXAMPLE 16
Oat Bran Hydrocolloid as a Substitute for Shortening or Dairy Cream in Desserts Fudge Brownies for Giving 1.28 g β-glucan/100 g Portion Oat bran hydrocolloid invention product (50 g) prepared by the process of Example 1 was mixed with 236 g sugar and 120 ml water and blended in a Kitchen Aid® mixer. With continued blending, 2 egg whites (Egg Beaters®) and 70 g cocoa were added. The mixture was beaten throughly, gradually adding and beating in 0.2 tsp (1 ml) vanilla, 90 g oat flour, 0.1 tsp (0.6 g) salt and 0.2 tsp (0.7 g) baking powder. To the batter, 40 ml of water was mixed in to make a smooth batter that was poured into a 8"×8"×2" (20 cm×20 cm×5 cm) pan coated with PAM® vegetable oil spray. The batter was baked 25–30 minutes at 350° F. (177° C.) and cut into pieces. The total batch (663 g) contained a total of 8.5 g β-glucan or 0.76 g β-glucan per 2-ounce portion.

EXAMPLE 17
Oatmeal Cake

Oat bran hydrocolloid (44 g) prepared according to Example 1 was mixed with 220 g white sugar, 200 g brown sugar and 180 ml water to a smooth cream. To the creamed mixture were added 4 egg whites (Egg Beaters®), 200 g applesauce, 1 tsp (6 g) cinnamon, 0.3 tsp (2 g) nutmeg, 0.5 tsp (3 g) salt, 2 tsp (6 g) baking soda. The batter was mixed well with gradually adding and beating in 130 g oat flour and 130 g oatmeal. A small amount of water or applesauce was added to make a smooth pourable batter that was poured into a 8"×8"×2" (20 cm×20 cm ×5 cm) tared pan coated with PAM® vegetable oil. The batter was baked 25–30 min at 350° F. (177° C.) and cooled to give 1312 g of cake. A 3 oz. (85 g) piece contained 1.0 g β-glucan.

EXAMPLE 18
Chewy Oatmeal Cookies

Oat bran hydrocolloid prepared according to Example 1 (35 g) was blended well in a Kitchen Aid® mixer with 65 g white sugar, 65 g brown sugar, 6 g Myvatex® texture lite, 165 ml water. To the mixture 2 egg whites (Egg Beaters®), and 260 g applesauce were mixed in thoroughly before gradually beating in 0.5 tsp. (2.5 ml) vanilla, 0.5 tsp (3 g) cinnamon, 0.5 tsp (3 g) nutmeg, 0.5 tsp (3 g) salt, 1 tsp (3 g) baking soda, 50 g oat flour and 150 g oat flakes. To the batter, 90 g raisins were hand mixed into the mixture prior to pouring onto a cookie tray for yielding about 1-ounce (28 g) cookies. The cookies were baked at 350° F. (177° C.) for 10–20 min or longer until golden brown to give a total cookie batch weight of 784 g. A 45 g protion (2 cookies) contained 0.75 g β-glucan.

EXAMPLE 19
Muffin Preparation

Figure 2:
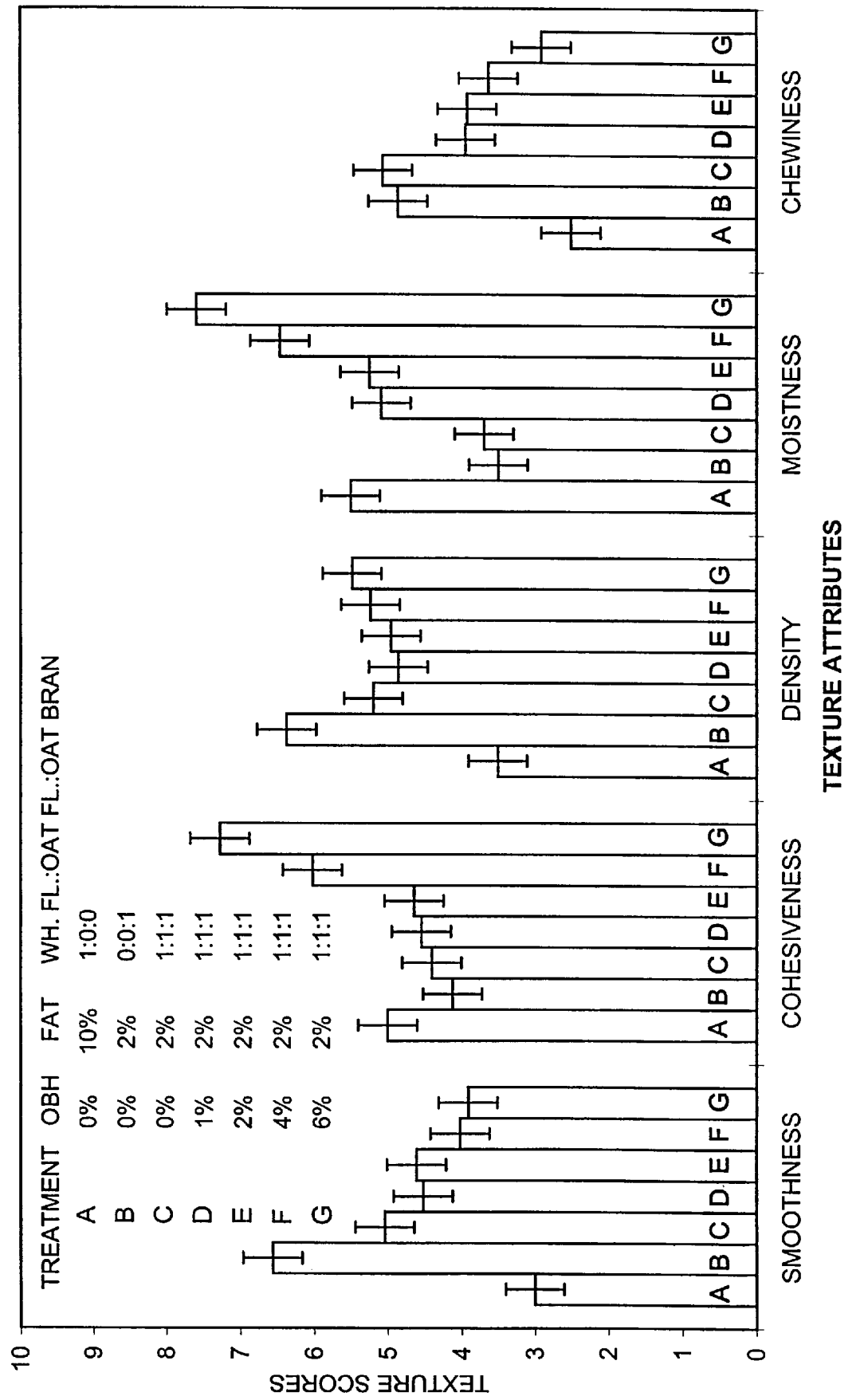
FIG. 2 presents the results of texture evaluation of muffins prepared with various levels of the oat bran hydrocolloid of the invention.

For the standard muffin mix, the following ingredients were weighed at 25° C.:

115 g wheat flour
25 g sugar
5.4 g baking powder
50 g whole egg
99 g milk (2% fat)
24 g soybean oil The egg was beaten separately and then blended with the milk and oil. In the test samples, oat flour and oat bran replaced part of the wheat flour, oat bran hydrocolloid (OBH) was added, and the oil was omitted. The proportions of the varied components are shown in FIGS. 1 & 2. The dry ingredients, including the oat bran hydrocolloid, were sieved five times to thoroughly blend the ingredients, and the liquid component was added. The batter was stirred with a rubber spatula until just slightly lumpy, and 66–67 g portions were weighed into each hole of a non-stick muffin pan. The number of muffins per batch varied from 7 to 12, depending on the formulation. The muffins were baked for 20 minutes at 220° C., and cooled to room temperature before storing in plastic bags.

Muffin Sensory Panel

Cubes (2.5 cm) cut from the interior of the muffins were evaluated by a trained, experienced analytical sensory panel 2 hours after preparation. Collected data were analyzed using software Compusense 5 (Compusense, Inc. v.2.4, Guelph, Ontario, Canada). The flavor and texture evaluations are summarized in FIGS. 1 and 2, respectively. The flavor intensity scale ranged from 0 for none to 10 for strong. The texture scales were as follows:

| Texture attributes | Scale | |
|---|---|---|
| | 0 | 10 |
| smoothness | smooth | grainy |
| cohesiveness | crumbly | gummy |
| density | light | compact |
| moistness | dry | moist |
| chewiness | tender | tough |

EXAMPLE 20
Pasting Properties

The pasting properties were compared for (1) an oat bran hydrocolloid prepared by the method of Example 1, (2) a hydrolyzed oat bran as described in U.S. Pat. No. 5,082,673, and (3) an untreated oat bran control.

Samples were dispersed in water at a solids content of 10% (dry weight basis).

Pasting properties of the samples were determined by using a Rapid Visco Analyzer® (RVA) (Model RVA-4 Newport Scientific, Australia) operated with a total weight of 30 g. The RVA procedure begins with rapid stirring at 960 rpm for 10 sec to disperse the sample followed by stirring at 160 rpm. The sample was heated from 30° C. to the maximum temperature of 95° C. in 10 min, held at 95° C. for 5.5 min and then cooled to 50° C. in 7.5 min.

Figure 3:
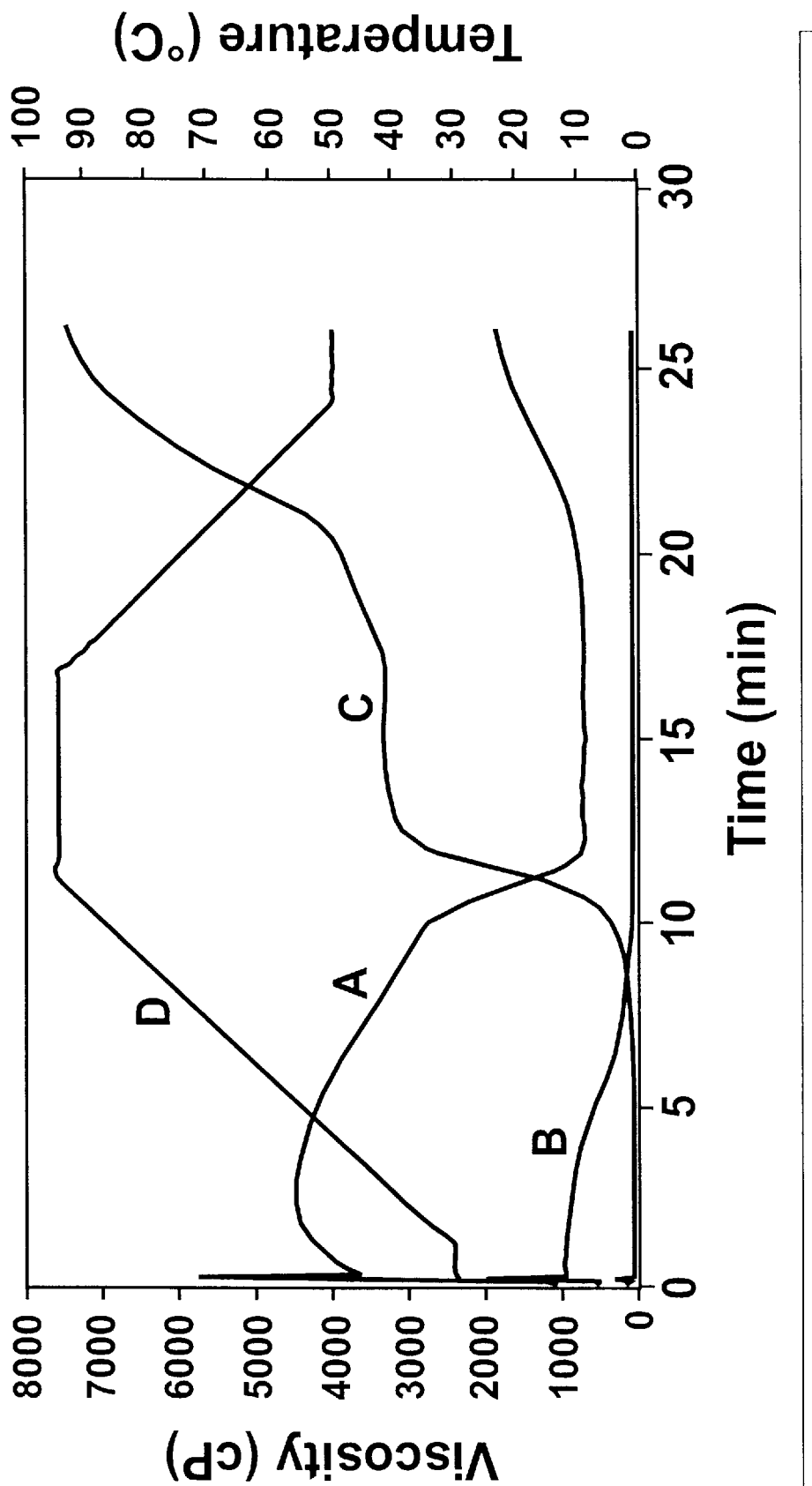
FIG. 3 is a series of viscograms comparing the pasting properties of oat bran hydrocolloid prepared in accordance with the invention with hydrolyzed oat bran and unprocessed oat bran.

The viscograms for these samples were plotted together in FIG. 3.

I claim:

1. A water-soluble, thermo-shear-thinning hydrocolloid comprising starch and at least about 1% β-glucan.

2. The hydrocolloid of claim 1 further characterized by the property that, when dispersed in water at 10% solids, it yields a viscosity greater than 5 poises at 25° C. and exhibits a decrease in viscosity greater than 50% on heating to 95° C.

3. The hydrocolloid of claim 1, wherein the crude fiber content is less than about 1%.

4. The hydrocolloid of claim 1 further characterized by comprising solubles from a first substrate selected from the group consisting of oat flour, oat bran and barley flour.

5. The hydrocolloid of claim 4 further characterized by comprising solubles from a substrate different from the first substrate and selected from the group consisting of cereal bran, cereal flour, soybean flour, cereal starch, and tuber starch.

6. A method for preparing a water-soluble, thermo-shear-thinning hydrocolloid comprising at least about 1% β-glucan, wherein said β-glucan consists essentially of solubilized β-glucan comprising:

a. subjecting an aqueous slurry of a first substrate selected from the group consisting of oat flour, oat bran and barley flour to a temperature in the range of about 75–190° C. under conditions of shear sufficient to disrupt the cellular structure of said substrate;

b. separating the slurry in (a) into a soluble fraction and an insoluble fraction;

c. and recovering said soluble fraction.

7. The method of claim 6 wherein said separation in step (b) is conducted by filtration.

8. The method of claim 6 wherein said separation in step (b) is conducted by centrifugation.

9. The method of claim 6 further comprising:

(d) drying the soluble fraction recovered in step (c).

10. The method of claim 6 wherein said slurry in step (a) further comprises a substrate different from the first substrate and selected from the group consisting of cereal bran, cereal flour, soybean flour, cereal starch, and tuber starch.

11. A product comprising starch and at least about 1% β-glucan produced by the process of claim 6.

12. A product comprising starch and at least about 1% β-glucan produced by the process of claim 9.

13. A product comprising starch and at least about 1% β-glucan produced by the process of claim 10.

* * * * *